US008808895B2

(12) United States Patent
Malek et al.

(10) Patent No.: US 8,808,895 B2
(45) Date of Patent: Aug. 19, 2014

(54) BATTERY PROTECTION STRUCTURES (75) Inventors: Shayan Malek, San Jose, CA (US); Miguel C. Christophy, San Francisco, CA (US); Jared M. Kole, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/530,641

(22) Filed: Jun. 22, 2012

(65) Prior Publication Data

US 2013/0344352 A1 Dec. 26, 2013

(51) Int. Cl.
*H01M 2/10* (2006.01)
(52) U.S. Cl.
CPC .......... *H01M 2/10* (2013.01); *H01M 2/1094* (2013.01); *H01M 2/1005* (2013.01)
USPC .......... 429/100; 429/96; 429/97; 429/98; 429/99; 429/143; 429/148; 429/151; 429/153; 429/163; 429/164; 429/165; 429/166; 429/167; 429/168; 429/170; 429/171; 429/172; 429/173; 429/174; 429/175; 429/176; 429/177; 429/178; 429/179; 429/180; 429/181; 429/182; 429/183; 429/184; 429/185; 429/186; 429/187; 429/208; 429/7; 429/121; 429/156
(58) Field of Classification Search
USPC .............. 429/208, 96–100, 163–187
See application file for complete search history.

(56) References Cited

U.S. PATENT DOCUMENTS

| | | | | |
|---|---|---|---|---|
| 5,174,049 | A * | 12/1992 | Flemming | 36/28 |
| 5,906,872 | A * | 5/1999 | Lyden et al. | 428/52 |
| 6,951,365 | B2 * | 10/2005 | Chase et al. | 296/187.03 |
| 7,732,092 | B2 * | 6/2010 | Oh | 429/175 |
| 8,114,539 | B2 * | 2/2012 | Lee et al. | 429/120 |
| 2006/0144885 | A1 * | 7/2006 | Smeuninx | 224/629 |
| 2007/0173150 | A1 * | 7/2007 | Bhatnagar et al. | 442/135 |
| 2008/0193838 | A1 * | 8/2008 | Oh | 429/175 |
| 2009/0004557 | A1 * | 1/2009 | Lasarov et al. | 429/122 |
| 2011/0135985 | A1 * | 6/2011 | Kim | 429/120 |
| 2011/0150705 | A1 * | 6/2011 | Doyle et al. | 422/82.02 |
| 2011/0177377 | A1 * | 7/2011 | Dube | 429/153 |
| 2011/0210954 | A1 * | 9/2011 | Murphy et al. | 345/211 |

(Continued)

OTHER PUBLICATIONS

Two-Shot Injection Molding: by R.J. Digiantonio, Plastics 101 Presentation at Society of Plastics Engineers, ANTEC, Detroit MI (May 1992).*

(Continued)

*Primary Examiner* — Milton I Cano
*Assistant Examiner* — Wojciech Haske
(74) *Attorney, Agent, or Firm* — Brownstein Hyatt Farber Schreck, LLP (57) ABSTRACT

A battery may have a foil battery pack with leads that are coupled to a printed circuit board. Battery protection structures formed from an insulating material such as plastic may be used to protect the foil battery pack. The foil battery pack may have a rectangular shape with front and rear faces surrounded by a rectangular peripheral edge. The battery protection structures may have a ring shape that surrounds the peripheral edge while leaving the front and rear faces exposed to minimize the size of the battery protection structures. An elastomeric material may be used to form the battery protection structures. The elastomeric material may allow the battery protection structures to stretch when the battery pack expands during use. Two shots of plastic may be incorporated into the battery protection structures to provide both puncture resistance and the ability to stretch during use.

16 Claims, 13 Drawing Sheets

(56) References Cited

U.S. PATENT DOCUMENTS

| | | | |
|---|---|---|---|
| 2011/0223461 A1* | 9/2011 | Kim | 429/120 |
| 2011/0223474 A1* | 9/2011 | Kim et al. | 429/181 |
| 2011/0240064 A1* | 10/2011 | Wales et al. | 134/26 |
| 2011/0318623 A1* | 12/2011 | Lee et al. | 429/100 |
| 2012/0035518 A1* | 2/2012 | Einarsson et al. | 602/16 |
| 2012/0088141 A1* | 4/2012 | Lee et al. | 429/120 |

OTHER PUBLICATIONS

Perry's Chemical Engineer's Handbook, 7th edition, Table 28-27.*

* cited by examiner

BATTERY PROTECTION STRUCTURES

BACKGROUND

This relates to electronic devices and, more particularly, to batteries for electronic devices.

Electronic devices such as cellular telephones and other portable devices are often provided with batteries such as lithium ion batteries. In a typical configuration, the material layers that make up the anode and cathode for the battery are enclosed in a foil pack.

In applications in which a battery for a device is a removable component, a foil battery pack is typically enclosed within a hard plastic case with metal contacts. A battery of this type will be sufficiently durable to withstand damage during normal handing, but will also be considerably more bulky than an unpackaged foil pack.

Electronic devices that forgo the use of removable batteries can be fabricated more compactly, because the hard plastic case of the battery can be eliminated. Nonetheless, the mounting of foil packs directly within electronic device housings poses challenges. If care is not taken, a foil battery pack may be punctured or scratched when contacted by components within an electronic device housing such as printed circuit board shields, clips, and other components.

It would therefore be desirable to be able to provide improved battery structures for an electronic device.

SUMMARY

An electronic device may be provided with electrical components such as circuits on a printed circuit board and a battery. The components may be mounted within an electronic device housing. The battery may have a foil battery pack with leads that are coupled to the printed circuit board.

Battery protection structures formed from a material such as plastic may be used to protect the foil battery pack. The foil battery pack may have a rectangular shape with front and rear faces surrounded by a rectangular peripheral edge. The battery protection structures may have a ring shape with vertical walls that surrounds the peripheral edge and protects the foil battery pack from punctures and scratches. The battery protection structures may have openings such as openings that leave the front and rear faces of the foil battery pack exposed.

An elastomeric material may be used to form the battery protection structures so that the battery protection structures can stretch when the battery pack expands during use. Two shots of plastic may be incorporated into the battery protection structures to provide both puncture resistance and the ability to stretch during use.

Further features of the invention, its nature and various advantages will be more apparent from the accompanying drawings and the following detailed description of the preferred embodiments.

DETAILED DESCRIPTION

Battery packs may be formed from layers of material such as anode and cathode layers. Aluminum foil or other metal foils may be used to encapsulate the layers and thereby preventing the leakage of electrolyte.

Battery packs such as foil battery packs may be fragile and subject to damage during installation and use within an electronic device. To prevent damage, battery enclosure structures may be provided. The battery enclosure structures may occupy considerably less room than a traditional battery housing, making them suitable for use in electronic devices in which space is at a premium.

Figure 1:
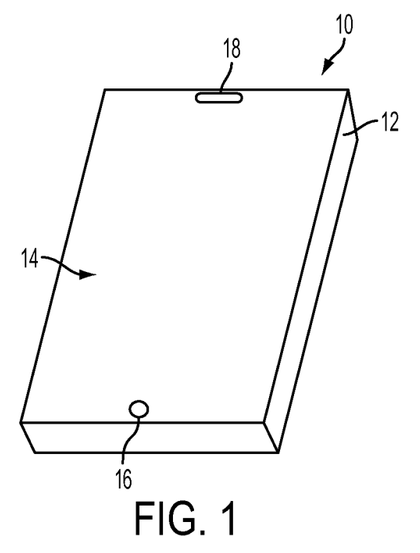
FIG. 1 is a front perspective view of an illustrative electronic device of the type that may be provided with battery structures in accordance with an embodiment of the present invention.

An illustrative electronic device of the type that may be provided with a battery is shown in FIG. 1. Device 10 of FIG. 1 may be a handheld device such as a cellular telephone or media player, a tablet computer, a notebook computer, other portable computing equipment, a wearable or miniature device such as a wristwatch or pendant device, a television, a computer monitor, or other electronic equipment.

As shown in FIG. 1, electronic device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of electrowetting display pixels, or display pixels based on other display technologies. Configurations in which display 14 includes display layers that form liquid crystal display (LCD) pixels may sometimes be described herein as an example. This is, however, merely illustrative. Display 14 may include display pixels formed using any suitable type of display technology.

Display 14 may be protected using a display cover layer such as a layer of transparent glass or clear plastic. Openings may be formed in the display cover layer. For example, an opening may be formed in the display cover layer to accommodate a button such as button 16 and an opening such as opening 18 may be used to form a speaker port. Device configurations without openings in display 14 may also be used for device 10.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Figure 2:
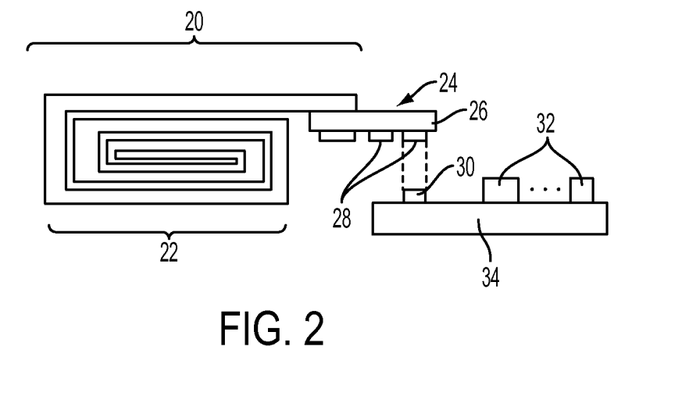
FIG. 2 is a cross-sectional end view of a foil battery pack in accordance with an embodiment of the present invention.

A cross-sectional side view of a battery that may be used in device 10 is shown in FIG. 2. As shown in the illustrative configuration of FIG. 2, battery 20 may include battery structures such as foil battery pack 22. Foil battery pack 22 may contain rolled sheets of material that form an anode and a cathode and may contain associated electrolyte. A metal foil such as an aluminum foil or other metal foil may be used as part of the layers that form pack 22. The metal foil may form somewhat fragile outer surfaces on pack 22.

Leads such as battery leads 24 may be coupled to foil battery structures 22. Leads 24 may include a dielectric substrate such as substrate 26 and metal contacts 28. Substrate 26 may be formed from a rigid printed circuit board (e.g., fiberglass-filled epoxy) or a flexible printed circuit (e.g., a sheet of polyimide or a layer of other flexible polymer). When assembled into a device, leads 24 may be electrically connected to circuitry such as processors, memory, and other electronic components 32. As an example, components 32 may be mounted on a substrate such as printed circuit 34 having conductive traces 30 that are electrically connected to traces 28 (e.g., using solder, welds, conductive adhesive, connectors, etc.). Battery 20, which may sometimes be referred to as a battery pack, foil battery pack, or foil pack may be based on a lithium chemistry or other suitable battery chemistry.

To prevent damage such as scratches or punctures, foil battery pack 20 may be mounted within protective battery structures such as elastomeric battery protection structures 36. Structures 36 may be formed from insulating materials such silicone, polycarbonate, or other plastics (as an example). In the illustrative configuration of FIG. 3, battery protection structures 36 have a ring shape with vertical walls and a rectangular interior opening that receives battery pack 20.

Figure 3:
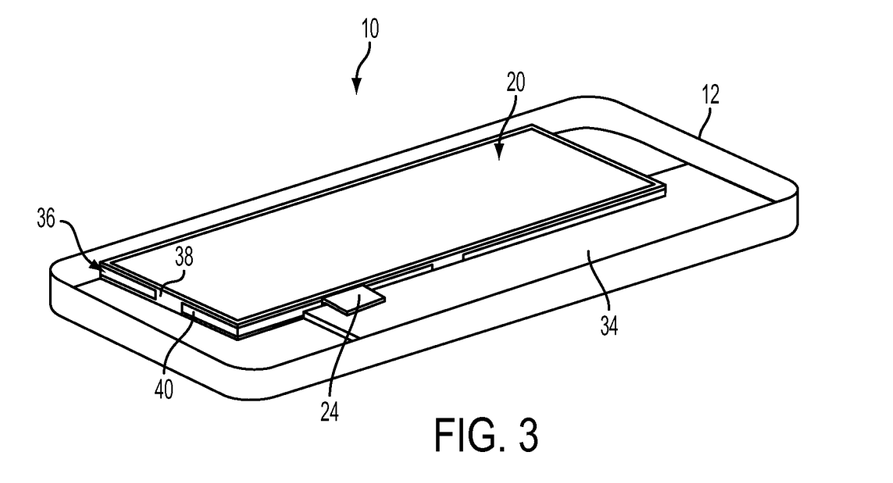
FIG. 3 is a perspective view of a foil battery pack enclosed in a battery band and mounted in the interior of an electronic device housing in accordance with an embodiment of the present invention.

By using an elastomeric material to form some or all of structures 36, structures 36 can be stretched to fit over battery pack 20 during assembly. Structures 36 may also be stretched to remove structure 36 should rework be required. By using a shape for battery protection structure 36 that does not fully enclose all six sides of battery pack 20 (e.g., a shape that leaves the opposing upper and lower rectangular faces of rectangular battery pack 20 exposed), the amount of volume that is occupied by structures 36 can be minimized.

A two-shot plastic molding process may be used in forming battery protection structures 36. The first shot of plastic may be a harder structure such as hard plastic structures 40 (e.g., a hard plastic structure formed form a material such as polycarbonate, nylon, or other plastic that is relatively hard—at least compared to the softer portions of structures 36). The presence of hard plastic structures 40 may help structures 36 prevent scratches or punctures to battery pack 20. The second shot of plastic may be a structure such as soft plastic structures 38 that is formed from silicone or other plastic that is relatively soft and stretchy. The second plastic shot may, for example, be used to provide structures 36 with an elastomeric quality that allows structures 36 to be stretched to accommodate thermal expansion of battery pack 20 during operation in device 10. The ability of structures 36 to stretch may also facilitate attachment and removal of structures 36 from battery pack 20 during initial assembly, rework, and repair operations.

Any suitable materials may be used in forming structures 40 and 38. As examples, soft plastic structures 38 may be formed form a silicone or other elastomeric material having a Shore A hardness of about 20-40, 20-85, 30-70, less than 40, less than 50, less than 60, or less than 70 (as examples). Hard plastic structures 40 may be formed from a harder plastic than plastic structures 38. For example, plastic structures 40 may be formed from a polymer having a Shore A hardness of about 85-100 or more than 85 (as examples).

Recesses or other openings may be provided in structures 36 to accommodate leads 24 or other structures in device 10. Leads 24 may be coupled to traces on printed circuit 34 or other circuitry in device 10. Due to the presence of protective structures 36, foil battery pack 20 will be protected from damage due to contact with components on printed circuit 34 or elsewhere in the interior of device housing 12.

Figure 4:
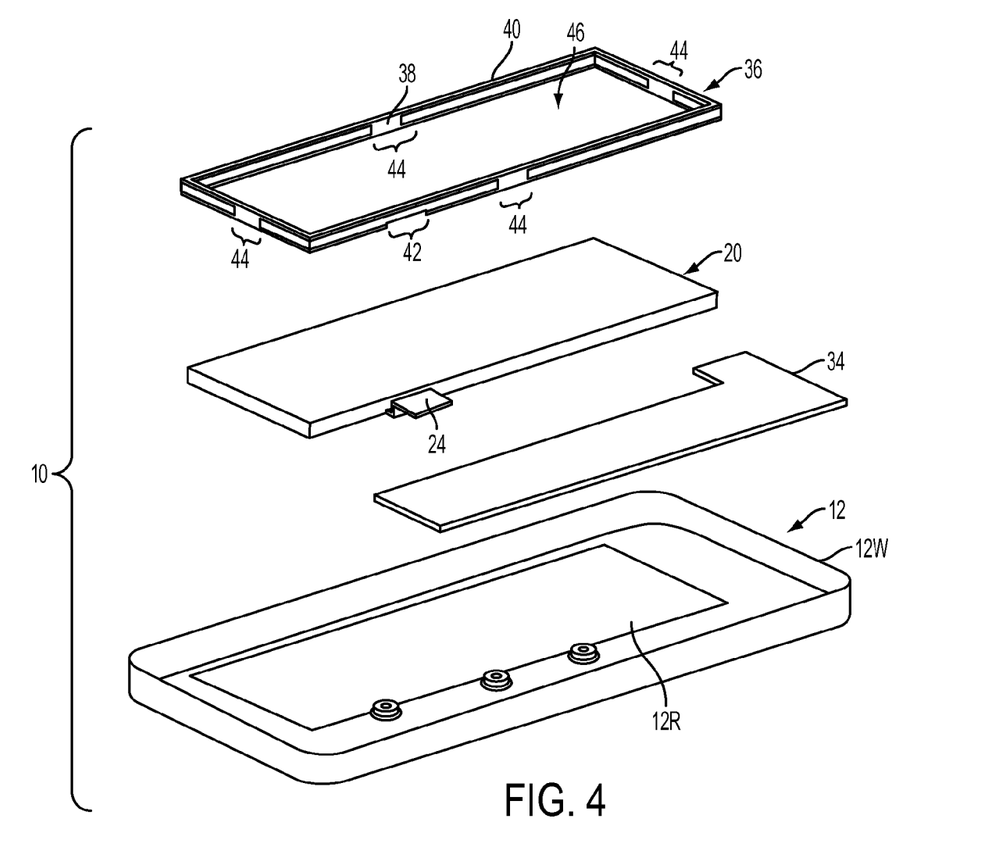
FIG. 4 is an exploded perspective view of an elastomeric battery protection structure such as an O-shaped band with vertical walls and an associated battery and electronic device housing in accordance with an embodiment of the present invention.

An exploded perspective view of the components of FIG. 3 is shown in FIG. 4. As shown in FIG. 4, electronic device housing 12 may have housing walls such as walls 12W and a planar rear surface such as rear wall 12R. Printed circuit 34, battery pack 20, and other device components may be mounted in the recessed portion formed by walls 12W.

Battery protection structures 36 of FIG. 4 have a rectangular ring shape with vertical walls. Rectangular opening 46 in structure 36 may have a size and shape that is configured to receive rectangular battery pack 20. Recess 42 in battery protection structures 36 may allow lead 24 to protrude through structure 36 to couple battery pack 20 to printed circuit 34 or other circuitry in electronic device 10.

Figure 5:
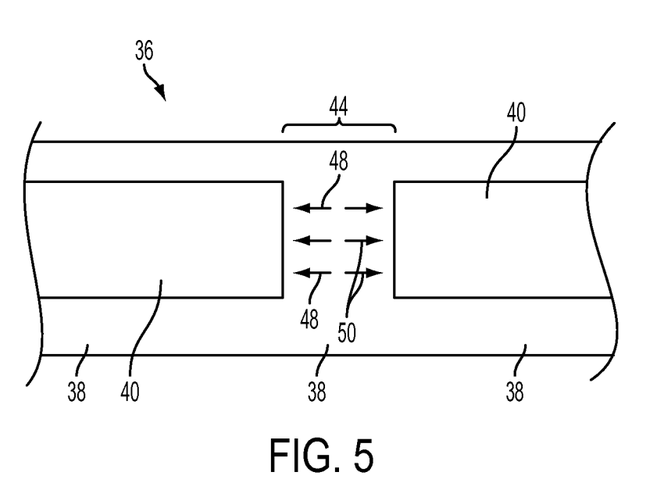
FIG. 5 is a side view of a portion of an illustrative battery protection structure formed from two shots of plastic in accordance with an embodiment of the present invention.

Battery protection structures 36 may have hard plastic portions 40 that are surrounded with soft plastic portions 38. Gaps such as gaps 44 in hard plastic structures 40 may be provided to divide hard plastic structures 40 into segments. As shown in FIG. 5, soft plastic 38 in gaps 44 can stretch outwards in directions 48 and 50 during insertion (or removal) of battery pack 20 into opening 46. There may be any suitable number of gaps 44 along band 36. In the example of FIG. 4, there are four gaps 44, each of which is located roughly in the center of a different respective one of the four edges of rectangular ring structure 36. Other number of gaps 44 in hard plastic 40 may be used if desired (e.g., at least one gap, at least two gaps, at least three gaps, at least four gaps, etc.).

Figure 6:
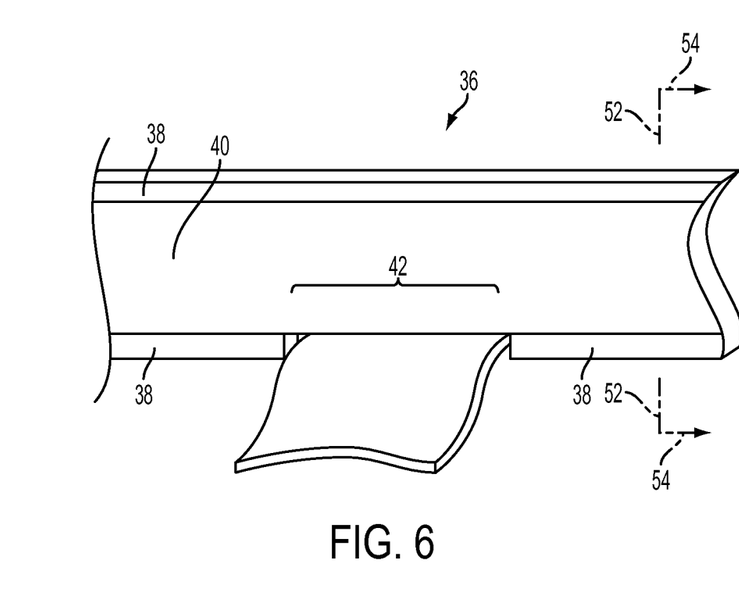
FIG. 6 is a perspective view of a portion of a battery protection band or other battery protection structure showing how the structure may be provided with a notch to accommodate battery leads in accordance with an embodiment of the present invention.

FIG. 6 shows how leads 24 (e.g., leads on a flexible printed circuit substrate or rigid printed circuit substrate) may protrude through recess 42 of battery protection structures 36. Recess 42 may pass only through plastic structures 38 or may pass through portions of structures 38 and portions of structures 40.

Figure 7:
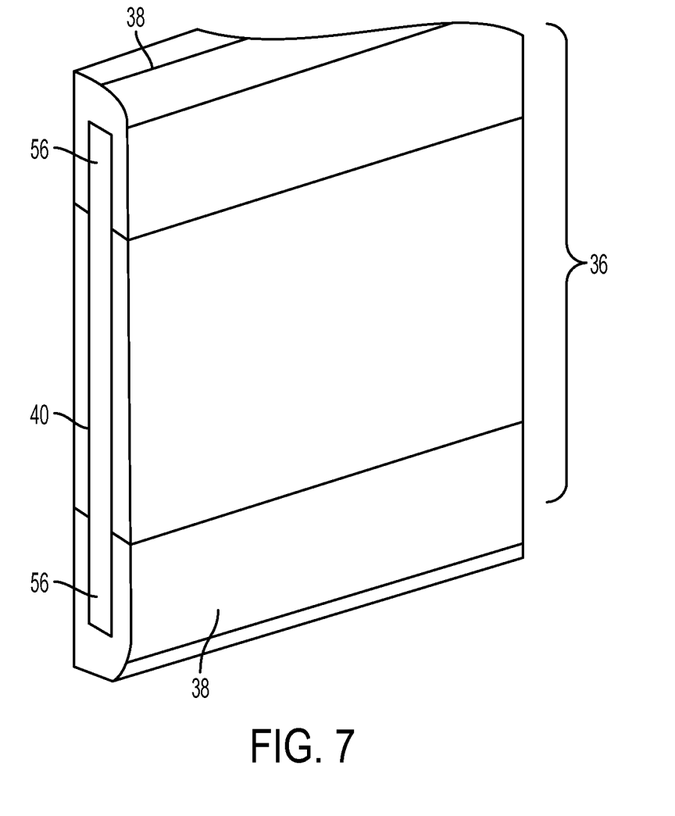
FIG. 7 is a cross-sectional perspective view of a battery band structure formed from multiple shots of plastic in accordance with an embodiment of the present invention.

A cross-sectional view of battery protection structure 36 of FIG. 6 taken along line 52 and viewed in direction 54 is shown in FIG. 7. As shown in FIG. 7, hard plastic structures 38 may have engagement features such as protrusions 56 that are configured to engage with soft plastic structures 38. As an example, protrusions 56 may have the shape of thin fins that extend to either side of the main band formed from hard plastic structures 40.

During a two-shot molding process, a molding tool (e.g., an injection molding tool, a compression molding tool, or other equipment for forming plastic parts) may be used to form a second shot of plastic (i.e., soft plastic structures 38) on top of fins 56, thereby embedding fins 56 within soft plastic structures 38. The presence of protrusions such as fins 56 or other engagement features on plastic structures 38 and/or 40 may help prevent structures 38 and 40 from becoming separated from each other during use. Other types of engagement features may be used to help attach structures 38 and 40 to each other (e.g., pins, holes, etc.). The configuration of FIG. 7 is merely illustrative.

Figure 8:
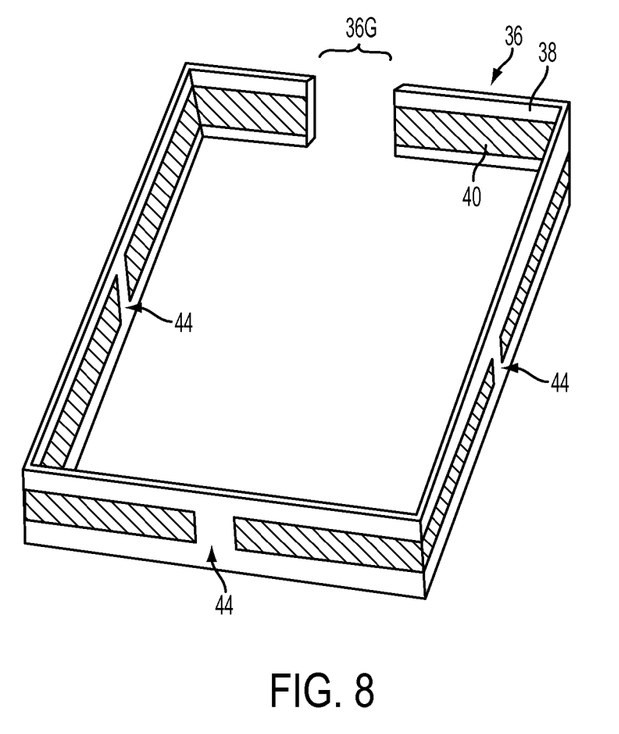
FIG. 8 is a perspective view of a ring-shaped protective battery band with a gap to accommodate battery leads in accordance with an embodiment of the present invention.

Battery protection structures 36 of FIG. 4 have a rectangular ring shape (e.g., a rectangular O-shape). If desired, battery protection structures 36 may have a rectangular ring shape (0-shape) with a gap such as gap 36G of FIG. 8. Structures 36 of FIG., 8 may have a rectangular ring shape with an opening such as gap 36G along one of its shorter sides or along one of its longer sides. Gaps such as gap 36G may be used to accommodate leads 24. Gaps such a gap 36G may also facilitate assembly of battery pack 20 within battery protection structures 36.

Figure 9:
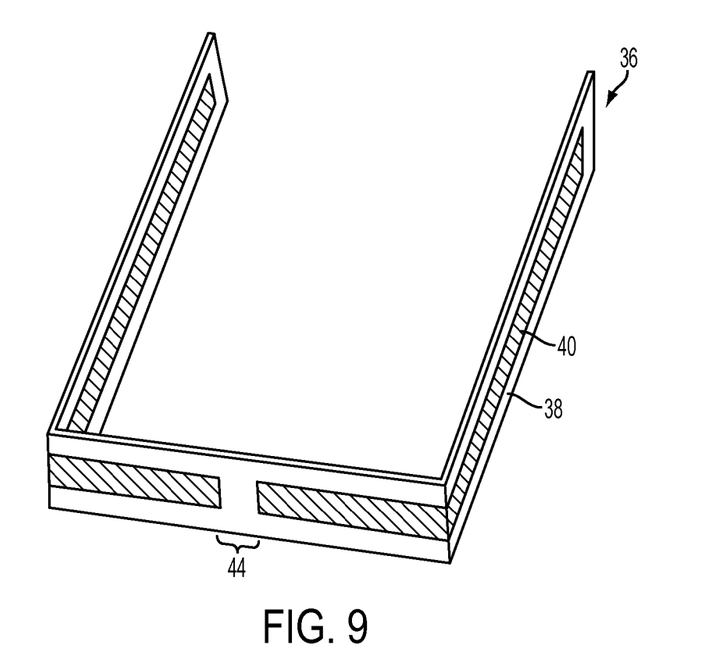
FIG. 9 is a perspective view of an illustrative U-shaped protective battery band in accordance with an embodiment of the present invention.

If desired, battery protection structures 36 may have a U-shape of the type shown in FIG. 9. Structures such as structures 36 of FIGS. 8 and 9 may, if desired, be formed from a single shot of plastic or may be formed from three or more shots of plastic. The configurations of FIGS. 8 and 9 in which battery protection structures 36 have been formed from two shots of plastic is merely illustrative.

Figure 10:
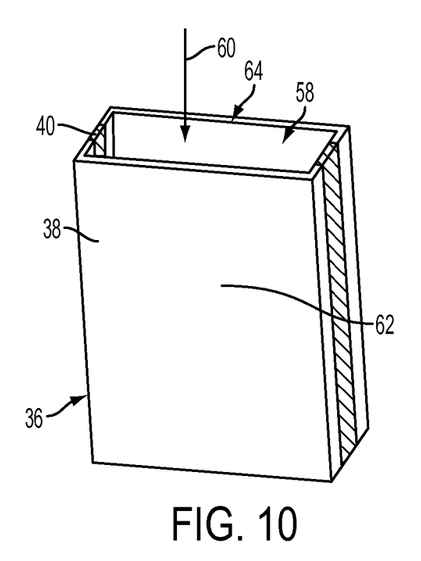
FIG. 10 is a perspective view of an illustrative battery protection structure having the shape of a pouch in accordance with an embodiment of the present invention.

In the illustrative configuration of FIG. 10, battery protection structures 36 have been implemented by forming an elastomeric sleeve structure having an opening along one side such as opening 58. The elastomeric sleeve may have a shape that resembles a five-sided box formed by removing one side from a six-sided box. The sleeve structure of FIG. 10 allows battery protection structures 36 of FIG. 10 to serve as a pocket into which battery pack 20 may slide in direction 60. Leads 24 may protrude from the end of battery 20 in opening 58.

Battery protection structures 36 may be formed from a single material (e.g., a hard plastic structure or soft elastomeric plastic structure) or may be formed from a combination of hard and soft plastics such as hard plastic structures 40 and soft plastic structures 38, as shown in FIG. 10. Hard plastic structures 40 may be incorporated into battery protection structures 36 at locations at which there is a potential for contact with device structures and resulting damage. For example, hard plastic structures 40 may, if desired, be formed on front face 62 and opposing rear face 64 of the sleeve of FIG. 10 in addition to or instead of incorporating hard plastic structures 40 into sidewall portions of the sleeve.

Figure 11:
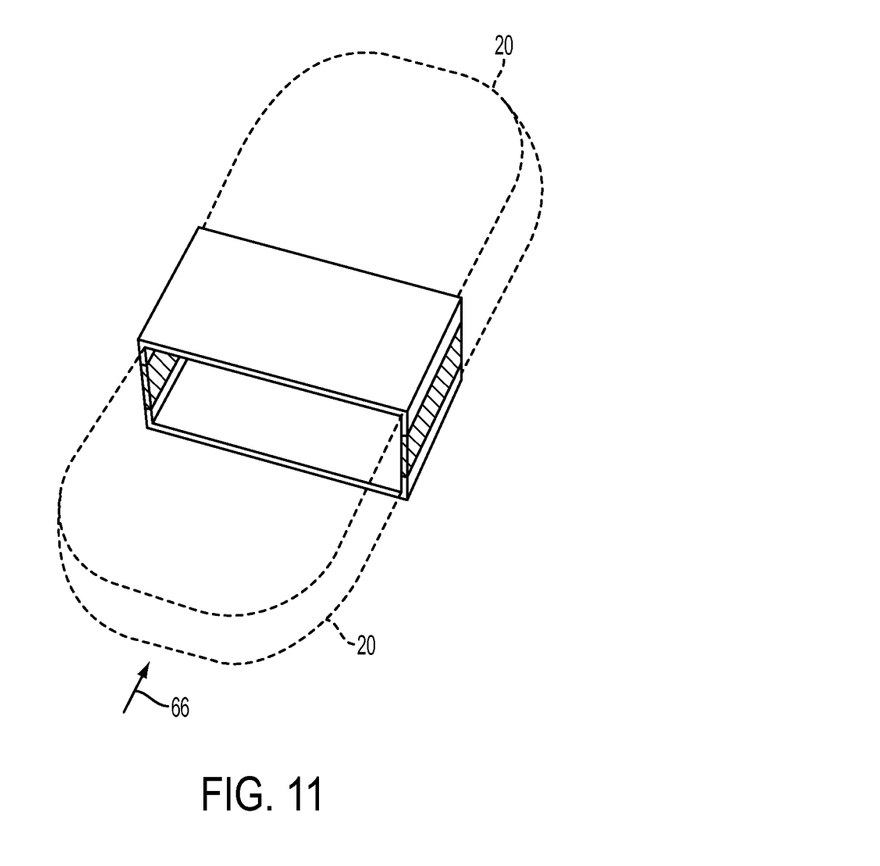
FIG. 11 is a perspective view of a battery protection structure configured to wrap around a central portion of a battery in accordance with an embodiment of the present invention.

FIG. 11 is a perspective view of battery protection structures 36 in an illustrative configuration in which battery protection structures 36 form a strip that is wrapped around a central portion of battery pack 20, rather than around the peripheral edges of the rectangular outline of battery pack 20. Battery protection structures 36 may be formed from one shot of plastic (e.g., soft plastic or hard plastic) or from two or more shots of plastic. Battery pack 20 may be mounted in battery protection structures 36 by inserting battery pack 20 into the band formed from structures 36 in direction 66 (as an example).

Figure 12:
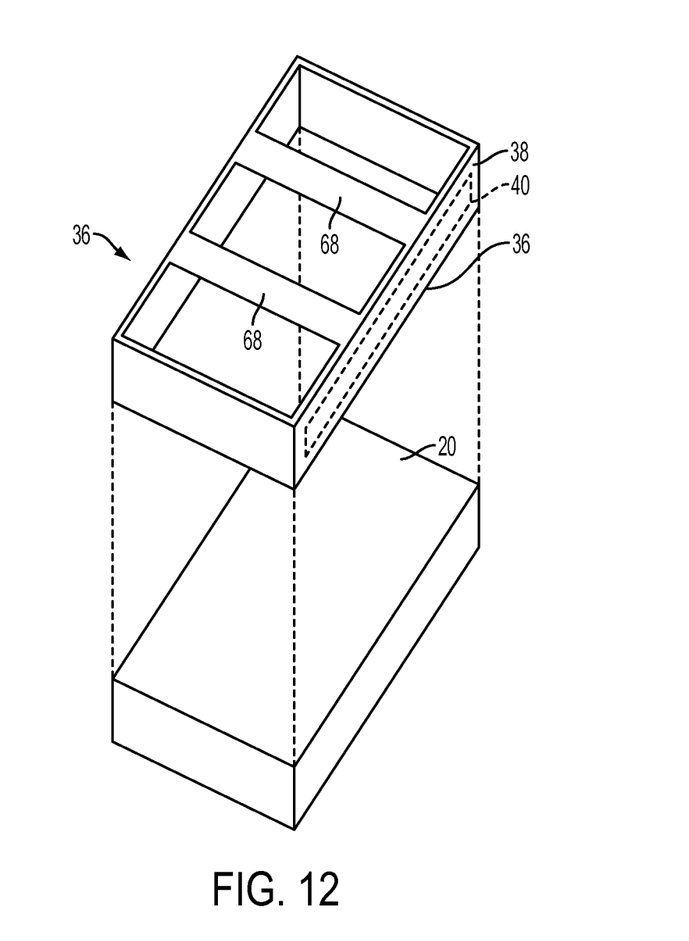
FIG. 12 is a perspective view of a protective battery band having a ring member that surrounds an opening that is configured to receive a battery and having ribs that bridge the opening in accordance with an embodiment of the present invention.

FIG. 12 is an exploded perspective view of battery protection structures 36 and an associated battery pack (battery pack 20) in a configuration in which battery protection structures 36 have a rectangular ring-shaped band with an opening that is bridged by ribs 68. Structures 36 may be formed from one type of plastic or may include soft plastic structure 38 and hard plastic structures 40.

Figure 13:
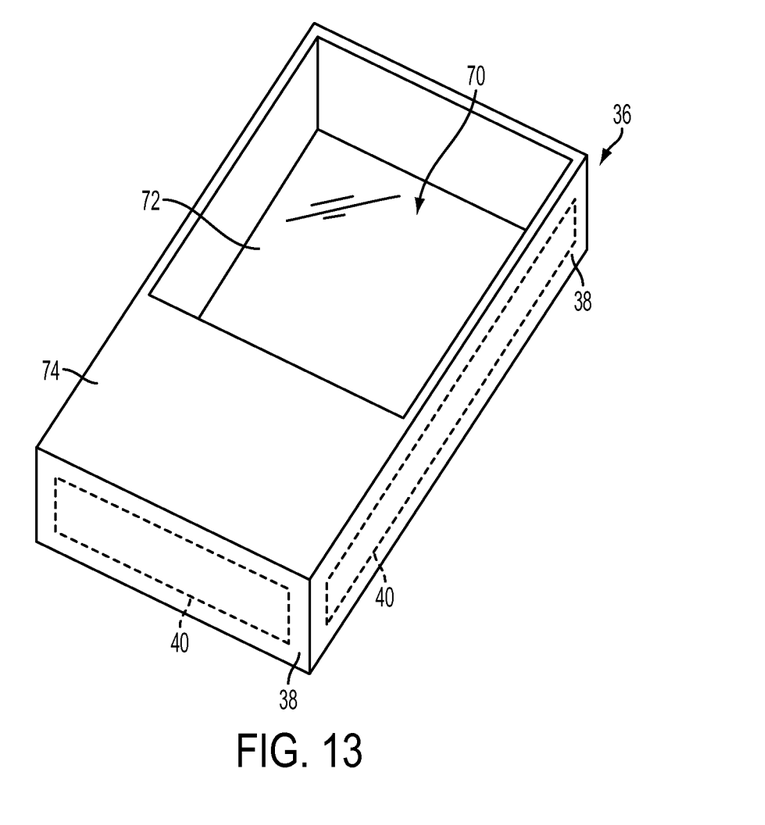
FIG. 13 is a perspective view of an illustrative battery protection structure formed from a pouch that has an opening in one of its surfaces to receive a battery pack in accordance with an embodiment of the present invention.

In the illustrative configuration of FIG. 13, battery protection structures 36 have the shape of a pouch formed from a rectangular band-shaped ring that has front and rear faces. Rear face 72 may extend over the entire rear opening of the sidewall band that runs around the rectangular periphery of structures 36. Front face 74 may have an opening such as opening 70 to receive battery pack 20. Soft plastic structures 38 and/or hard plastic structures 40 may be used in forming battery protection structures 36 of FIG. 13.

The inclusion of soft plastic structures 38 in battery protection structures 36 of FIGS. 1-12 may allow battery pack 20 to expand when heated during use without cracking or otherwise damaging battery protection structures 36. The walls and other members formed by hard plastic structures 40 may be sufficiently durable to withstand wear from rubbing against internal device components during use in device 10. The use of vertical walls in structures 36 may help structures 36 and battery pack 20 fit within the potentially tight confines of electronic device 10.

Battery pack 20 is generally at least partly exposed to the environment, which may render battery pack 20 unsuitable for removable battery applications such as consumer applications in which batteries are being removed, recharged, and replaced repeatedly by a device user. Because battery pack 20 is only partly enclosed (i.e., because there is generally an opening in battery protection structures 36 that overlaps some or all of the front and rear surfaces of the battery pack or other battery pack surfaces and that therefore leaves part of the foil or other fragile material of battery pack 20 exposed), the overall volume occupied by battery protection structures 36 for non-removable battery 20 will tend to be less than the volume associated with battery enclosures for user-replaceable removable batteries. If desired, battery pack 20 and protective battery structures 36 can be installed and uninstalled occasionally (e.g., for rework in a factory or for repair).

The foregoing is merely illustrative of the principles of this invention and various modifications can be made by those skilled in the art without departing from the scope and spirit of the invention. The foregoing embodiments may be implemented individually or in any combination.

What is claimed is:

1. An apparatus, comprising:
a foil battery pack; and
battery protection structures that surround the foil battery pack comprising: a plastic ring with vertical walls that runs around a peripheral edge of the foil battery pack, the plastic ring including a first shot of plastic including plurality of gaps that separate the first shot of plastic into a plurality of segments with a second shot of material that stretches to allow the foil battery pack to expand; wherein the battery protection structures have an opening that exposes at least some of the foil battery pack.

2. The apparatus defined in claim 1 wherein the second shot of material comprises a second shot of plastic.

3. The apparatus defined in claim 2 wherein the first shot of plastic is harder than the second shot of plastic.

4. The apparatus defined in claim 3 wherein the first shot of plastic has a Shore A hardness of 85-100 and wherein the second shot of plastic has a Shore A hardness of 20-85.

5. The apparatus defined in claim 1 wherein the plastic ring comprises elastomeric structures.

6. The apparatus defined in claim 1 wherein the battery protection structures have a recess, wherein the foil battery pack has leads, and wherein the recess is configured to allow the leads to pass through the recess.

7. An electronic device, comprising:
a housing;
a printed circuit mounted in the housing;
a foil battery pack having leads coupled to the printed circuit and having opposing first and second faces surrounded by a peripheral edge; and
battery protection structures that protect the peripheral edge of the foil battery pack comprising: a plastic ring with vertical walls that runs around the peripheral edge of the foil battery pack, the plastic ring including a first shot of plastic including plurality of gaps that separate the first shot of plastic into a plurality of segments with a second shot of material that stretches to allow the foil battery pack to expand;
wherein the battery protection structures have an opening that exposes at least some of the first face of the foil battery pack.

8. The electronic device defined in claim 7 wherein the first shot of plastic has a first hardness, the second shot of material comprises a second shot of plastic that has a second hardness that is less than the first hardness.

9. The electronic device defined in claim 8 wherein the plastic ring comprises a rectangular ring-shaped band that surrounds the peripheral edge.

10. The electronic device defined in claim 9 wherein the rectangular ring-shaped band has a notch through which the leads protrude.

11. The electronic device defined in claim 7 wherein the battery protection structures are configured to form an additional opening that exposes at least some of the second face of the foil battery pack.

12. A battery protection structures for protecting a rectangular foil battery pack having opposing first and second faces surrounded by a peripheral edge, comprising:
a ring-shaped plastic structure with vertical walls that runs around the peripheral edge to surround and protect the peripheral edge while leaving the first and second faces exposed, the ring-shaped plastic structure including a first structure formed of plastic including plurality of gaps that separate the first shot of plastic into a plurality of segments with a second structure that stretches to allow the foil battery pack to expand.

13. The battery protection structures defined in claim 12 wherein the second structure is a second structure formed of plastic.

14. The battery protection structures defined in claim 13 wherein the first structure formed of plastic has a first hardness and wherein the second structure formed of plastic has a second hardness that is less than the first hardness.

15. The battery protection structures defined in claim 12 wherein the ring-shaped plastic structure comprises at least one material with a Shore A hardness of less than 50.

16. The battery protection structures defined in claim 12 wherein the second structure has a Shore A hardness of less than 40.

* * * * *